United States Patent
Zhang et al.

(10) Patent No.: US 12,172,325 B2
(45) Date of Patent: Dec. 24, 2024

(54) COLLISION DETECTION METHOD, COMPUTER-READABLE STORAGE MEDIUM, AND ROBOT

(71) Applicant: UBTECH ROBOTICS CORP LTD, Shenzhen (CN)

(72) Inventors: Meihui Zhang, Shenzhen (CN); Yizhang Liu, Shenzhen (CN); Youjun Xiong, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 266 days.

(21) Appl. No.: 18/075,426

(22) Filed: Dec. 6, 2022

(65) Prior Publication Data
US 2023/0191606 A1     Jun. 22, 2023

(30) Foreign Application Priority Data

Dec. 20, 2021 (CN) .......................... 202111561944.2

(51) Int. Cl.
*B25J 9/00* (2006.01)
*B25J 9/16* (2006.01)

(52) U.S. Cl.
CPC .................. *B25J 9/1674* (2013.01)

(58) Field of Classification Search
CPC ...... B25J 9/1674; B25J 9/1676; B25J 9/1666; B25J 9/1602; B25J 9/1633; G05B 2219/37624; G05B 2219/39355
See application file for complete search history.

(56) References Cited

U.S. PATENT DOCUMENTS

2020/0061835 A1\* 2/2020 Haddadin .............. B25J 9/1674
2023/0063392 A1\* 3/2023 Farnioli ................. B25J 9/1633

\* cited by examiner

*Primary Examiner* — Ian Jen (57) ABSTRACT

A collision detection method, a storage medium, and a robot are provided. The method includes: calculating an external torque of a first joint of the robot based on a preset generalized momentum-based disturbance observer; calculating an external torque of a second joint of the robot based on a preset long short-term memory network; calculating an external torque of a third joint of the robot based on the external torque of the first joint and the external torque of the second joint; and determining whether the robot has collided with an external environment or not based on the external torque of the third joint and a preset collision threshold. In the present disclosure, the component of the model error in the joint external torque calculated by the disturbance observer is eliminated to obtain the accurate contact torque, thereby improving the accuracy of the collision detection.

20 Claims, 3 Drawing Sheets

COLLISION DETECTION METHOD, COMPUTER-READABLE STORAGE MEDIUM, AND ROBOT

CROSS REFERENCE TO RELATED APPLICATIONS

The present disclosure claims priority to Chinese Patent Application No. 202111561944.2, filed Dec. 20, 2021, which is hereby incorporated by reference herein as if set forth in its entirety.

BACKGROUND

1. Technical Field

The present disclosure relates to robot technology, and particularly to a collision detection method, a computer-readable storage medium, and a robot.

2. Description of Related Art

With the popularity of collaborative robots in various production and life scenarios, the possibility of the robots to interact with people and the external environment has greatly increased. Therefore, the force perception of the robots when interacting with the external environment is particularly important, which is the basic part to achieve the safe operation of the force control of the robots. At present, for the collision detection when a robot interacts with the external environment, in the current mainstream technical solution, on the one hand, a threshold may be set for the output torque of the joint motor or the change rate of that to determine whether a collision occurs, but the accuracy of this method is not high and it can detect, in most cases, only when a large contact force is generated; on the other hand, a dynamics model of the robot may be established to realize the prediction of the joint torque of the robot during movement through parameter identification. However, it is difficult to establish an accurate joint friction model, and there are still errors in the parameter identification. Furthermore, the joint acceleration of the robot is required to be obtained when calculating the joint torque through the dynamics model, while the acceleration information is usually cannot be obtained directly and using the indirect method of velocity differentiation will introduce data noise. Combining the forgoing factors, there will be a large error in the joint external torque calculated by this solution, that is to say, even if the robot does not collide with the external environment, the estimated joint external torque will still have a large value, which requires a large determination threshold to avoid false detection of collision while the excessively large threshold will reduce the accuracy of collision detection, and therefore causes a challenge to improve the safe operation of the robot.

BRIEF DESCRIPTION OF THE DRAWINGS

To describe the technical schemes in the embodiments of the present disclosure or in the prior an more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", and the like in the descriptions are only used for distinguishing, and cannot be understood as indicating or implying relative importance.

Figure 1:
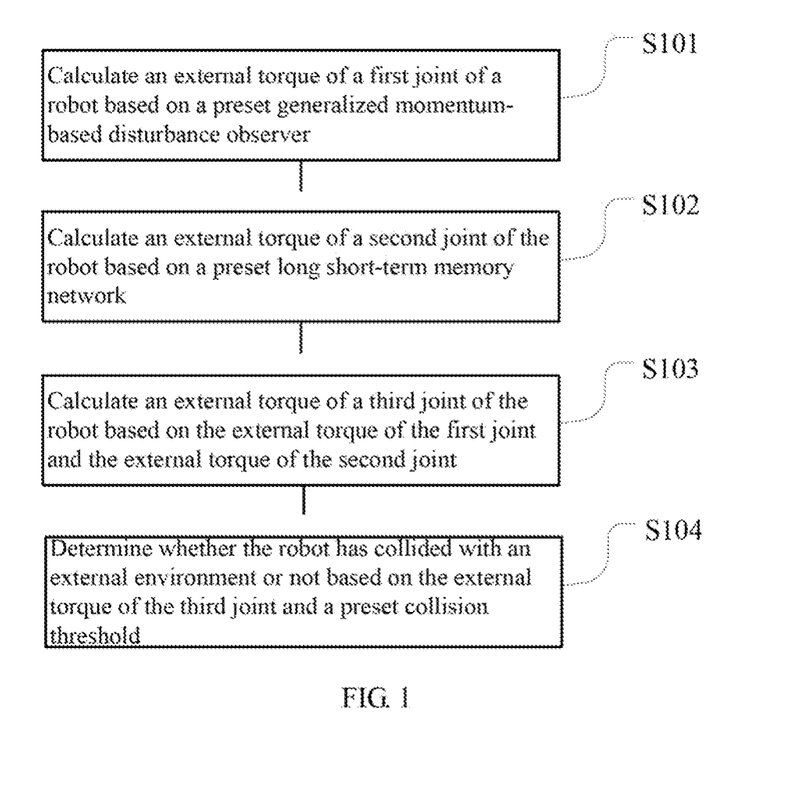
FIG. 1 is a flow chart of a collision detection method according to an embodiment of the present disclosure.

FIG. 1 is a flow chart of a collision detection method according to an embodiment of the present disclosure. In this embodiment, the collision detection method is a computer-implemented method executable for (a processor of) a robot (e.g., a robotic arm) having a plurality of joints (e.g., joints 33 in FIG. 3). In other embodiments, the method may be implemented through a collision detection apparatus shown in FIG. 2 or a robot shown in FIG. 3. As shown in FIG. 1, in this embodiment, the collision detection method may include the following steps.

S101: calculating an external torque of a first joint of the robot based on a preset generalized momentum-based disturbance observer.

In the presence of external force, a rigid body dynamics equation of the robot may be expressed as an equation of:

$$M(q)\ddot{q}+C(q,\dot{q})\dot{q}+g(q)+\tau_f=\tau_m+\tau_{ext} \quad (1)$$

where, $q \in R^n$ is a joint position of the robot, $\dot{q} \in R^n$ is a joint velocity of the robot, $\ddot{q} \in R^n$ is a joint acceleration of the robot, $M(q) \in R^{n \times n}$ is a symmetric positive definite inertia matrix of the robot, $C(q,\dot{q}) \in R^{n \times n}$ is a Coriolis force and centrifugal force matrix of the robot, and $g(q) \in R^n$ is a gravity vector of the robot, $\tau_f \in R^n$ is a joint friction torque of the robot, $\tau_m \in R^n$ is a joint torque of the robot, $\tau_{ext} \in R^n$ is a joint external torque of the robot, and n is the degree of freedom of the robot.

According to the basic characteristics of the rigid body dynamics equation, it can be deduced to obtain an equation of:

$$\dot{M}(q)\dot{q}=C(q,\dot{q})\dot{q}+C^T(q,\dot{q})\dot{q} \quad (2)$$

where, $C^T(q,\dot{q})$ is the transposed matrix of $C(q,\dot{q})$, and $\dot{M}(q)$ is the first derivative of $M(q)$.

The generalized momentum of the robot may be calculated by an equation of:

$$p=M(q)\dot{q} \quad (3)$$

where, p is the generalized momentum.

Taking the time derivative on both sides of equation (3), it can get that:

$$\dot{p}=M(q)\ddot{q}+\dot{M}(q)\dot{q} \quad (4)$$

where, $\dot{p}$ is the first derivative of p.

By substituting equations (1) and (2) into equation (4), it can get that:

$$\dot{p}=\tau_m+\tau_{ext}-\tau_f-C(q,\dot{q})\dot{q}-g(q)+\dot{M}(q)\dot{q}=\tau_m+\tau_{ext}-\tau_f+C^T(q,\dot{q})\dot{q}-g(q) \quad (5)$$

Therefore, the generalized momentum-based disturbance observer may be defined as equations of:

$$\begin{cases} \dot{\hat{p}} = \tau_m - \hat{\tau}_f - \hat{N}(q \cdot \dot{q}) + r \\ \dot{r} = K_o(\dot{p} - \dot{\hat{p}}) \end{cases} \quad (6)$$

where, $\hat{p}$ is the estimated value of p, $\dot{\hat{p}}=\hat{\dot{M}}(q)\dot{q}$, $\hat{M}(q)$ is the estimated value of $M(q)$, $\dot{p}$ is the first derivative of $\hat{p}$, $\hat{\tau}_f$ is the estimated value of $\tau_f$, $\hat{N}(q,\dot{q})=g(q)-C^T(q,\dot{q})\dot{q}$, $\hat{N}(q,\dot{q})$ is the estimated value of $N(q,\dot{q})$, $K_O$ is the gain matrix of the disturbance observer, r is the generalized momentum residual, $\dot{r}$ is the first derivative of r.

By integrating both sides of the second equation of equations (6), it can get that:

$$r=K_O(p(t)-\int_0^t(\tau_m-\hat{\tau}_f-\hat{N}(q,\dot{q})+r)dt-p(0)) \quad (7)$$

where, 0 is a preset initial moment, p(0) is the generalized momentum of the robot at the initial moment, t is a time variable, and p(t) is the generalized momentum of the robot at time t.

Under ideal conditions, $\hat{M}(q)=M(q)$, $\hat{N}(q,\dot{q})=N(q,\dot{q})$, and $\hat{\tau}_f=\tau_f$, then the relationship between the joint external torque $\tau_{ext}$ and the generalized momentum residual r is as an equations of:

$$\dot{r}=K_O(\tau_{ext}-r) \quad (8)$$

By performing Laplace transform on equation (8), it can get that:

$$r(s)=\frac{K_o}{s+K_o}\tau_{ext}(s)=\frac{1}{1+T_o s}\tau_{ext}(s) \quad (9)$$

where, r(s) is the Laplace transform of r, $\tau_{ext}(s)$ is the Laplace transform of $\tau_{ext}$, $T_O=1/K_O$. In the limit case, the following results can be derived:

$$K_O \to \infty \Rightarrow r \approx \tau_{ext} \quad (10)$$

Therefore, the generalized momentum residual r is the result of performing first-order low-pass filtering on the joint external torque $\tau_{ext}$. In this embodiment, the generalized momentum residual r can be calculated in real time by equation (7), and it can be approximately equivalent to the joint external torque $\tau_{ext}$. For the convenience of distinction, this equivalent quantity is denoted as the external torque of the first joint (e.g., one of the joints 33 in FIG. 3).

It can be seen from equation (7) that, when the generalized momentum-based disturbance observer is used to calculate the joint external torque, the joint acceleration information is not needed, and the external force of each joint of the robot is completely decoupled from the configuration of the robot. However, in actual situations, there are inevitably errors when identifying the dynamics model of the robot, namely $\hat{M}(q) \neq M(q)$, $\hat{N}(q,\dot{q}) \neq N(q,\dot{q})$, and $\hat{\tau}_f \neq \tau_f$. At the same time, it is impossible to establish a friction model that fully reflects the actual working conditions, and there will always be unconsidered factors to affect friction torque. Combining these two reasons, even if the robot does not collide, the generalized momentum residual r will still have a large value, and it usually set a large collision threshold to avoid false detection during movement, which reduces the sensitivity of collision detection. In order to solve this problem, in this embodiment, a long short-term memory (LSTM) network is used to learn the unmodeled error and model identification error, thereby compensating these errors to reduce the collision threshold so as to achieve the improvement of the accuracy of the collision detection.

S102: calculating an external torque of a second joint of the robot based on a preset long short-term memory network.

During the collection of the training data set, motion target points may be randomly generated in the workspace of the robot, and a trajectory may be planned for controlling the robot to move, thereby ensuring that the robot has no contact with the external environment during the movement of the robot. The joint position, joint velocity, temperature of the joint motor, and the generalized momentum residual output by the disturbance observer during the movement of the robot are collected to store in a time series so as to take as a subsequent training data set. It should be noted that in the case of no collision, the generalized momentum residual output by the disturbance observer is the unknown torque caused by the unmodeled error and the model identification error, namely $\tilde{\tau}_{err}=r$, where $\tilde{\tau}_{err}$ is the unknown torque caused by the unmodeled error and the model identification error that is denoted as the external torque of the second joint (e.g., one of the joints 33 in FIG. 3) for the convenience of differentiation.

After completing the collection of the training data set, the LSTM network can be created for learning. The LSTM network is a special form of recurrent neural network. After being expanded in time series, it will be a common three-layer (i.e., an input layer, a hidden layer, and an output layer) neural network.

The relationship between the external torque of the second joint and an inputted joint state time series may be expressed as an equation of:

$$\hat{\tau}_{err}=f(x_{err}) \qquad (11)$$

where, is f(•) the mapping from the input data to the output residual of the disturbance observer, $x_{err}$ is the inputted joint state time series, $x_{err}=[x(k-m+1) \ldots x(k-1), x(k)]$, m is the length of the joint state time series, k is the serial number at different moments, and x(k) is the joint state at time k, $x(k)=[q(k),\dot{q}(k),\dot{q}(k-1),T(k)]$, q(k) is the joint position at time k, $\dot{q}(k)$ is the joint velocity at time k, and T(k) is the temperature of the joint motor at time k.

Therefore, the LSTM network $f_\theta$ is trained to learn the mapping f(•), and the input $x_{LSTM}=x_{err}$ of the training is selected. Through the leaning of a large amount of data, the model of the robot state and the second joint torque is established, namely:

$$\tau_{LSTM}=f_\theta(x_{LSTM}) \qquad (12)$$

After the training of the LSTM network is completed, the joint state time series of the robot during movement may be collected, and the joint state time series may be inputted to the long short-term memory network for processing to use an output of the long short-term memory network as the external torque of the second joint, namely $\hat{\tau}_{err}=\tau_{LSTM}$.

S103: calculating an external torque of a third joint of the robot based on the external torque of the first joint and the external torque of the second joint.

Figure 3:
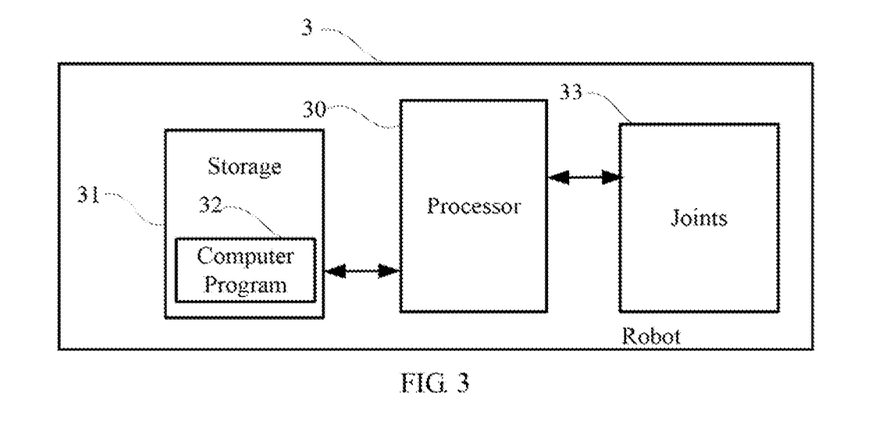
FIG. 3 is a schematic block diagram of a robot according to an embodiment of the present disclosure.

Specifically, a torque difference between the external torque of the first joint and the external torque of the second joint may be calculated based on an equation of:

$$\hat{\tau}_{ext}=r-\tau_{LSTM} \qquad (13)$$

where, $\hat{\tau}_{ext}$ is the torque difference, that is, the external torque of the joint after excluding the error which is denoted as the external torque of the third joint (e.g., one of the joints 33 in FIG. 3) here for the convenience of distinction.

S104: determining whether the robot has collided with an external environment or not based on the external torque of the third joint and a preset collision threshold.

Specifically, the external torque of the third joint may be compared with the collision threshold, and if the external torque of the third joint is larger than the collision threshold, it determines the robot as having collided with the external environment; and if the external torque of the third joint is smaller than or equal to the collision threshold, it determines the robot as having not collided with the external environment. In this embodiment, the value of the collision threshold may be set according to the actual situation, which is not specifically limited herein.

To sum up, in the present disclosure, by calculating an external torque of a first joint of a robot based on a preset generalized momentum-based disturbance observer; calculating an external torque of a second joint of the robot based on a preset long short-term memory network; calculating an external torque of a third joint of the robot based on the external torque of the first joint and the external torque of the second joint; and determining whether the robot has collided with an external environment or not based on the external torque of the third joint and a preset collision threshold, this embodiment calculates the real-time joint external torque using the generalized momentum-based disturbance observer while uses the long short-term memory network to learn to predict the unmodeled error and parameter identification error of the robot, and by combing the two, the component of the model error in the joint external torque calculated by the disturbance observer is eliminated to obtain the accurate contact torque between the robot and the external environment, thereby improving the accuracy of the collision detection of the robot such as a collaborative robot that the accuracy of the collision detection is essential for guaranteeing the safety of people and the robot itself.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 2:
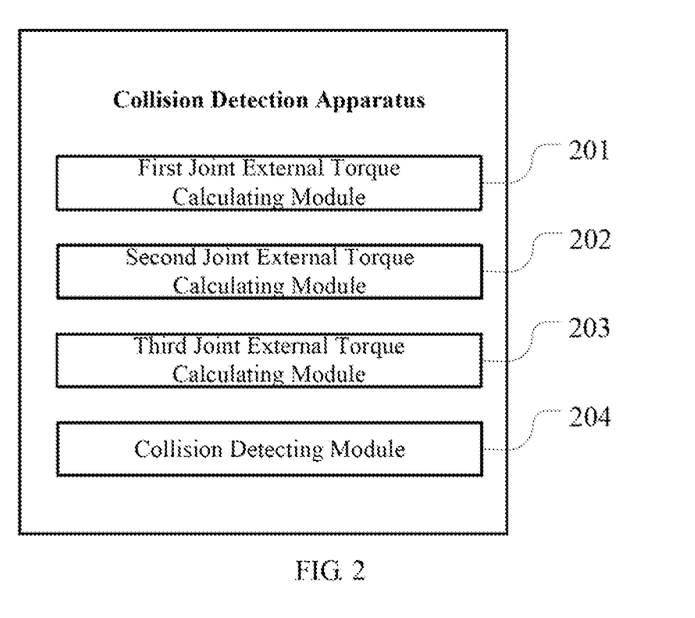
FIG. 2 is a schematic diagram of the structure of a collision detection apparatus according to an embodiment of the present disclosure.

FIG. 2 is a schematic diagram of the structure of a collision detection apparatus according to an embodiment of the present disclosure. Corresponding to the collision detection method described in the forgoing embodiment, a collision detection apparatus for a robot is provided.

In this embodiment, the collision detection apparatus may include:

a first joint external torque calculating module 201 configured to calculate an external torque of a first joint of the robot based on a preset generalized momentum-based disturbance observer;

a second joint external torque calculating module 202 configured to calculate an external torque of a second joint of the robot based on a preset long short-term memory network;

a third joint external torque calculating module 203 configured to calculate an external torque of a third joint of the robot based on the external torque of the first joint and the external torque of the second joint; and a collision detecting module 204 configured to determine whether the robot has collided with an external environment or not based on the external torque of the third joint and a preset collision threshold.

In an example of this embodiment, the first joint external torque calculating module 201 may include:

a generalized momentum residual calculating unit configured to calculate a generalized momentum residual of the robot based on the disturbance observer; and a first joint external torque calculating unit configured to calculate the external torque of the first joint based on the generalized momentum residual.

In an example of this embodiment, an expression of the disturbance observer is an equation of:

$$\begin{cases} \dot{p} = \tau_m - \hat{\tau}_f - \hat{N}(q \cdot \dot{q}) + r \\ r = K_o(p - \hat{p}) \end{cases} ;$$

where, p is the generalized momentum of the robot, $\hat{p}$ is an estimated value of p, $\tau_m$ is a joint torque of the robot, $\tau_f$ is a joint friction torque of the robot, $\hat{\tau}_f$ is an estimated value of $\tau_f$, q is a joint position of the robot, $\dot{q}$ is a joint velocity of the robot, $N(q,\dot{q})=g(q)-C^T(q,\dot{q})\dot{q}$, g(q) is a gravity vector of the robot, $C(q,\dot{q})$ is a Coriolis force and centrifugal force matrix of the robot, $C^T(q,\dot{q})$ is a transpose matrix of $C(q,\dot{q})$, $\hat{N}(q,\dot{q})$ is an estimated value of $N(q,\dot{q})$, $K_O$ is a gain matrix of the disturbance observer, and r is the generalized momentum residual.

In an example of this embodiment, the generalized momentum residual calculating unit is configured to calculate the generalized momentum residual based on an equation of:

$$r=K_O(p(t)-\int_0^t(\tau_m-\hat{\tau}_f-\hat{N}(q,\dot{q})+r)dt-p(0));$$

where, 0 is a preset initial moment, p(0) is the generalized momentum of the robot at the initial moment, t is a time variable, and p(t) is the generalized momentum of the robot at the initial moment t.

In an example of this embodiment, the second joint external torque calculating module 202 may be configured to: collecting a joint state time series of the robot during movement, wherein the joint state time series is a sequence composed of a plurality of joint states at different moments arranged in time order, and each of the joint states includes a joint position, a joint velocity, and a temperature of a joint motor, and inputting the joint state time series to the long short-term memory network for processing to use an output of the long short-term memory network as the external torque of the second joint.

In a specific implementation of this embodiment, the third joint external torque calculating module 203 may be specifically configured to calculating a moment difference between the external torque of the first joint and the external torque of the second joint; and determining the moment difference as the external torque of the third joint.

In an example of this embodiment, the collision detecting module 204 may be configured to: in response to the external torque of the third joint being larger than the collision threshold, determining the robot as having collided with the external environment; and in response to the external torque of the third joint being smaller than or equal to the collision threshold, determining the robot as having not collided with the external environment.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

FIG. 3 is a schematic block diagram of a robot according to an embodiment of the present disclosure. In this embodiment, a robot 3 (e.g., a collaborative robot) is provided. For convenience of description, only parts related to this embodiment are shown.

As shown in FIG. 3, in this embodiment, the robot 3 includes a processor 30, a storage 31, a computer program 32 stored in the storage 31 and executable on the processor 30, and joints 33. When executing (instructions in) the computer program 32, the processor 30 implements the steps in the above-mentioned embodiments of the collision detection method, for example, steps S101-S104 shown in FIG. 1. Alternatively, when the processor 30 executes the (instructions in) computer program 32, the functions of each module/unit in the above-mentioned device embodiments, for example, the functions of the modules 201-204 shown in FIG. 2 are implemented.

Exemplarily, the computer program 32 may be divided into one or more modules/units, and the one or more modules/units are stored in the storage 31 and executed by the processor 30 to realize the present disclosure. The one or more modules/units may be a series of computer program instruction sections capable of performing a specific function, and the instruction sections are for describing the execution process of the computer program 32 in the robot 3.

It can be understood by those skilled in the art that FIG. 3 is merely an example of the robot 3 and does not constitute a limitation on the robot 3, and may include more or fewer components than those shown in the figure, or a combination of some components or different components. For example, the robot 3 may further include an input/output device, a network access device, a bus, and the like.

The processor 30 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 31 may be an internal storage unit of the robot 3, for example, a hard disk or a memory of the robot 3. The storage 31 may also be an external storage device of the robot 3, for example, a plug-in hard disk, a smart media card (SMC), a secure digital (SD) card, flash card, and the like, which is equipped on the robot 3. Furthermore, the storage 31 may further include both an internal storage unit and an external storage device, of the robot 3. The storage 31 is configured to store the computer program 32 and other programs and data required by the robot 3. The storage 31 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented collision detection method for a robot, comprising:
   calculating an external torque of a first joint of the robot based on a preset generalized momentum-based disturbance observer;
   calculating an external torque of a second joint of the robot based on a preset long short-term memory network;
   calculating an external torque of a third joint of the robot based on the external torque of the first joint and the external torque of the second joint; and
   determining whether the robot has collided with an external environment or not based on the external torque of the third joint and a preset collision threshold.

2. The method of claim 1, wherein the calculating the external torque of the first joint of the robot based on the preset generalized momentum-based disturbance observer comprises:
   calculating a generalized momentum residual of the robot based on the disturbance observer; and
   calculating the external torque of the first joint based on the generalized momentum residual.

3. The method of claim 2, wherein an expression of the disturbance observer is an equation of:

$$\begin{cases} \dot{p} = \tau_m - \hat{\tau}_f - \hat{N}(q \cdot \dot{q}) + r \\ r = K_o(p - \hat{p}) \end{cases};$$

where, p is the generalized momentum of the robot, $\hat{p}$ is an estimated value of p, $\tau_m$ is a joint torque of the robot, $\tau_f$ is a joint friction torque of the robot, $\hat{\tau}_f$ is an estimated value of $\tau_f$, q is a joint position of the robot, $\dot{q}$ is a joint velocity of the b $N(q,\dot{q})=g(g)-C^T(q,\dot{q})\dot{q}$, g(q) is a gravity vector of the robot, $C(q,\dot{q})$ is a Coriolis force and centrifugal force matrix of the robot, $C^T(q,\dot{q})$ is a transpose matrix of $C(q,\dot{q})$, $\hat{N}(q,\dot{q})$ is an estimated value of $N(q,\dot{q})$, $K_O$ is a gain matrix of the disturbance observer, and r is the generalized momentum residual.

4. The method of claim 3, wherein the calculating the generalized momentum residual of the robot based on the disturbance observer comprises:
   calculating the generalized momentum residual based on an equation of:

$$r = K_O(p(t) - \int_0^t (\tau_m - \hat{\tau}_f - \hat{N}(q,\dot{q}) + r) dt - p(0));$$

where, 0 is a preset initial moment, p(0) is the generalized momentum of the robot at the initial moment, t is a time variable, and p(t) is the generalized momentum of the robot at the initial moment t.

5. The method of claim 1, wherein the calculating the external torque of the second joint of the robot based on the preset long short-term memory network comprises:
   collecting a joint state time series of the robot during movement, wherein the joint state time series is a sequence composed of a plurality of joint states at different moments arranged in time order, and each of the joint states includes a joint position, a joint velocity, and a temperature of a joint motor; and
   inputting the joint state time series to the long short-term memory network for processing to use an output of the long short-term memory network as the external torque of the second joint.

6. The method of claim 1, wherein the calculating the external torque of the third joint of the robot based on the external torque of the first joint and the external torque of the second joint comprises:
  calculating a moment difference between the external torque of the first joint and the external torque of the second joint; and
  determining the moment difference as the external torque of the third joint.

7. The method of claim 1, wherein the determining whether the robot has collided with the external environment or not based on the external torque of the third joint and the preset collision threshold comprises:
  in response to the external torque of the third joint being larger than the collision threshold, determining the robot as having collided with the external environment; and
  in response to the external torque of the third joint being smaller than or equal to the collision threshold, determining the robot as having not collided with the external environment.

8. A non-transitory computer-readable storage medium for storing one or more computer programs, wherein the one or more computer programs comprise:
  instructions for calculating an external torque of a first joint of a robot based on a preset generalized momentum-based disturbance observer,
  instructions for calculating an external torque of a second joint of the robot based on a preset long short-term memory network;
  instructions for calculating an external torque of a third joint of the robot based on the external torque of the first joint and the external torque of the second joint; and
  instructions for determining whether the robot has collided with an external environment or not based on the external torque of the third joint and a preset collision threshold.

9. The storage medium of claim 8, wherein the instructions for calculating the external torque of the first joint of the robot based on the preset generalized momentum-based disturbance observer comprise:
  instructions for calculating a generalized momentum residual of the robot based on the disturbance observer; and
  instructions for calculating the external torque of the first joint based on the generalized momentum residual.

10. The storage medium of claim 9, wherein an expression of the disturbance observer is an equation of:

$$\begin{cases} \dot{p} = \tau_m - \tau_f - \dot{N}(q \cdot \dot{q}) + r \\ r = K_o(p - \hat{p}) \end{cases};$$

where, p is the generalized momentum of the robot, $\hat{p}$ is an estimated value of p, $\tau_m$ is a joint torque of the robot, $\tau_f$ is a joint friction torque of the robot, $\hat{\tau}_f$ is an estimated value of $\tau_f$, q is a joint position of the robot, $\dot{q}$ is a joint velocity of the robot, $N(q,\dot{q})=g(q)-C^T(q,\dot{q})\dot{q}$, g(q) is a gravity vector of the robot, $C(q,\dot{q})$ is a Coriolis force and centrifugal force matrix of the robot, $C^T(q,\dot{q})$ is a transpose matrix of $C(q,\dot{q})$, $\hat{N}(q,\dot{q})$ is an estimated value of $N(q,\dot{q})$, $K_O$ is a gain matrix of the disturbance observer, and r is the generalized momentum residual.

11. The storage medium of claim 10, wherein the instructions for calculating the generalized momentum residual of the robot based on the disturbance observer comprises:
  instructions for calculating the generalized momentum residual based on an equation of:

$$r=K_O(p(t)-\int_0^t(\tau_m-\hat{\tau}_f-\hat{N}(q,\dot{q})+r)dt-p(0));$$

where, 0 is a preset initial moment, p(0) is the generalized momentum of the robot at the initial moment, t is a time variable, and p(t) is the generalized momentum of the robot at the initial moment r.

12. The storage medium of claim 8, wherein the instructions for calculating the external torque of the second joint of the robot based on the preset long short-term memory network comprise:
  instructions for collecting a joint state time series of the robot during movement, wherein the joint state time series is a sequence composed of a plurality of joint states at different moments arranged in time order, and each of the joint states includes a joint position, a joint velocity, and a temperature of a joint motor; and
  instructions for inputting the joint state time series to the long short-term memory network for processing to use an output of the long short-term memory network as the external torque of the second joint.

13. The storage medium of claim 8, wherein the instructions for calculating the external torque of the third joint of the robot based on the external torque of the first joint and the external torque of the second joint comprise:
  instructions for calculating a moment difference between the external torque of the first joint and the external torque of the second joint; and
  instructions for determining the moment difference as the external torque of the third joint.

14. A robot, comprising:
  a processor;
  a memory coupled to the processor, and
  one or more computer programs stored in the memory and executable on the processor;
  wherein, the one or more computer programs comprise:
  instructions for calculating an external torque of a first joint of the robot based on a preset generalized momentum-based disturbance observer;
  instructions for calculating an external torque of a second joint of the robot based on a preset long short-term memory network;
  instructions for calculating an external torque of a third joint of the robot based on the external torque of the first joint and the external torque of the second joint; and
  instructions for determining whether the robot has collided with an external environment or not based on the external torque of the third joint and a preset collision threshold.

15. The robot of claim 14, wherein the instructions for calculating the external torque of the first joint of the robot based on the preset generalized momentum-based disturbance observer comprise:
  instructions for calculating a generalized momentum residual of the robot based on the disturbance observer; and
  instructions for calculating the external torque of the first joint based on the generalized momentum residual.

16. The robot of claim 15, wherein an expression of the disturbance observer is an equation of:

$$\begin{cases} \dot{p} = \tau_m - \hat{\tau}_f - \hat{N}(q \cdot \dot{q}) + r \\ r = K_o(p - \hat{p}) \end{cases};$$

where, p is the generalized momentum of the robot, $\hat{p}$ is an estimated value of p, $\tau_m$ is a joint torque of the robot, $\tau_f$ is a joint friction torque of the robot, $\hat{\tau}_f$ is an estimated value of $\tau_f$, q is a joint position of the robot, $\dot{q}$ is a joint velocity of the robot, $N(q,\dot{q})=g(q)-C^T(q,\dot{q})\dot{q}$, g(q) is a gravity vector of the robot, $C(q,\dot{q})$ is a Coriolis force and centrifugal force matrix of the robot, $C^T(q,\dot{q})$ is a transpose matrix of $C(q,\dot{q})$, $\hat{N}(q,\dot{q})$ is an estimated value of $N(q,\dot{q})$, $K_O$ is again matrix of the disturbance observer, and r is the generalized momentum residual.

17. The robot of claim 16, wherein the instructions for calculating the generalized momentum residual of the robot based on the disturbance observer comprises:

instructions for calculating the generalized momentum residual based on an equation of:

$r=K_O(p(t)-\int_0^t(\tau_m-\hat{\tau}_f-\hat{N}(q,\dot{q})+r)dt-p(0))$;

where, 0 is a preset initial moment, p(0) is the generalized momentum of the robot at the initial moment, t is a time variable, and p(t) is the generalized momentum of the robot at the initial moment t.

18. The robot of claim 14, wherein the instructions for calculating the external torque of the second joint of the robot based on the preset long short-term memory network comprise:

instructions for collecting a joint state time series of the robot during movement, wherein the joint state time series is a sequence composed of a plurality of joint states at different moments arranged in time order, and each of the joint states includes a joint position, a joint velocity, and a temperature of a joint motor; and instructions for inputting the joint state time series to the long short-term memory network for processing to use an output of the long short-term memory network as the external torque of the second joint.

19. The robot of claim 14, wherein the instructions for calculating the external torque of the third joint of the robot based on the external torque of the first joint and the external torque of the second joint comprise:

instructions for calculating a moment difference between the external torque of the first joint and the external torque of the second joint; and instructions for determining the moment difference as the external torque of the third joint.

20. The robot of claim 14, wherein the instructions for determining whether the robot has collided with the external environment or not based on the external torque of the third joint and the preset collision threshold comprise:

instructions for, in response to the external torque of the third joint being larger than the collision threshold, determining the robot as having collided with the external environment; and instructions for, in response to the external torque of the third joint being smaller than or equal to the collision threshold, determining the robot as having not collided with the external environment.

* * * * *